(12) United States Patent
Goodwin

(10) Patent No.: US 7,650,392 B1
(45) Date of Patent: Jan. 19, 2010

(54) DYNAMIC CONTENT PROCESSING IN A REVERSE PROXY SERVICE

(75) Inventor: James Goodwin, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 10/910,687

(22) Filed: Aug. 2, 2004

(51) Int. Cl.
G06F 15/16 (2006.01)

(52) U.S. Cl. .................. 709/219; 709/225; 709/226; 709/228; 705/501; 705/513; 713/155; 713/202; 715/527

(58) Field of Classification Search .......... 709/225, 709/226, 229, 219; 715/501, 513, 527; 713/155–202
See application file for complete search history.

(56) References Cited

U.S. PATENT DOCUMENTS

| | | | |
|---|---|---|---|
| 6,654,807 B2 * | 11/2003 | Farber et al. | 709/225 |
| 6,965,939 B2 * | 11/2005 | Cuomo et al. | 709/229 |
| 2002/0129064 A1 * | 9/2002 | Guthrie | 707/513 |
| 2003/0037232 A1 * | 2/2003 | Bailiff | 713/153 |
| 2003/0061356 A1 * | 3/2003 | Jason, Jr. | 709/227 |
| 2003/0061515 A1 * | 3/2003 | Kindberg et al. | 713/201 |
| 2003/0217151 A1 * | 11/2003 | Roese et al. | 709/225 |
| 2004/0111491 A1 * | 6/2004 | Raja et al. | 709/219 |
| 2004/0177318 A1 * | 9/2004 | Raja et al. | 715/501.1 |
| 2004/0221231 A1 * | 11/2004 | Madril et al. | 715/527 |
| 2004/0226009 A1 * | 11/2004 | Mese et al. | 717/174 |
| 2005/0050165 A1 * | 3/2005 | Hamynen | 709/218 |
| 2006/0031404 A1 * | 2/2006 | Kassab | 709/218 |

OTHER PUBLICATIONS

"Module mod_rewrite URL Rewriting Engine", Apache Http Server Version 1.3, pp. 1-24, can be found at http://httpd.apache.org/docs/mod/mod_rewrite.html.

* cited by examiner

Primary Examiner—Saleh Najjar
Assistant Examiner—Thuong T Nguyen
(74) Attorney, Agent, or Firm—Darby & Darby P.C.; Jamie L. Wiegand

(57) ABSTRACT

A method and apparatus for managing dynamic content processing in a reverse proxy server. The reverse proxy server may include modules for handling dynamic links, invalid or incorrect HTML code, and the like, in HTTP data. The reverse proxy server may further accept user- or administrator-defined specific modules for handling HTTP data. Upon receiving the HTTP data from the host server in response to a request from a client, the reverse proxy server determines whether pre-patching module(s) or post-patching module(s) are to be executed. Depending on the determination specific modules are executed before, after, or before and after generic patching. In one embodiment, the modules may include tags for automatic starting of an application tunnel, when an application requiring an application tunnel is to be launched at a host server.

28 Claims, 6 Drawing Sheets ions and others that the present invention has been made.
DYNAMIC CONTENT PROCESSING IN A REVERSE PROXY SERVICE

FIELD OF THE INVENTION

The present invention relates to network communications, and in particular, to a method and system for dynamically processing content as it flows through a reverse proxy server.

BACKGROUND

A reverse proxy server may be used to represent a secure content server to an outside client, preventing direct, unmonitored access to an intranet host server's data from outside the intranet. The reverse proxy server may also be used for replication; that is, multiple proxy servers may be associated with a heavily used host server for load balancing. In a system employing the reverse proxy server, an outside client trying to access a host server is directed to the reverse proxy server. Real content may reside on the host server, safely on one side the firewall. The reverse proxy server may reside on the other side the firewall, and appear to the client to be the host server.

A typical reverse proxy server for the Internet may be configured such that the incoming Hyper Text Transfer Protocol (HTTP) requests intended for the host server are directed to the reverse proxy server. Upon receiving the HTTP request, the reverse proxy server for the Internet may determine whether it has a copy of the requested object stored locally. If so, the reverse proxy server for the Internet may respond to the HTTP request. If not, the reverse proxy server for the Internet may employ a Transmission Control Protocol (TCP) connection over the Internet to the intended host server. The reverse proxy server may then employ the TCP connection to send the HTTP request to the host server. If the request is successful, the host server may send the requested object to the reverse proxy server.

Upon receiving the requested object from the host server, the reverse proxy server may perform content processing, also called content patching. Content patching commonly refers to the process of modifying links in the requested object, which may be a web page or other form of data. When the links are modified, the reverse proxy server may send the requested object to the client.

The above described process may work well for objects including exclusively static Hyper Text Markup Language (HTML) data. However, many web pages and other forms of HTTP data include dynamic links created by eXtensible Markup Language (XML)java script or java applets. Furthermore, minor problems with links such as syntax errors, missing symbols are generally not recognized by content patching applications resulting in incorrect or invalid links in the processed web page. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE PREFERRED EMBODIMENT

Figure 1:
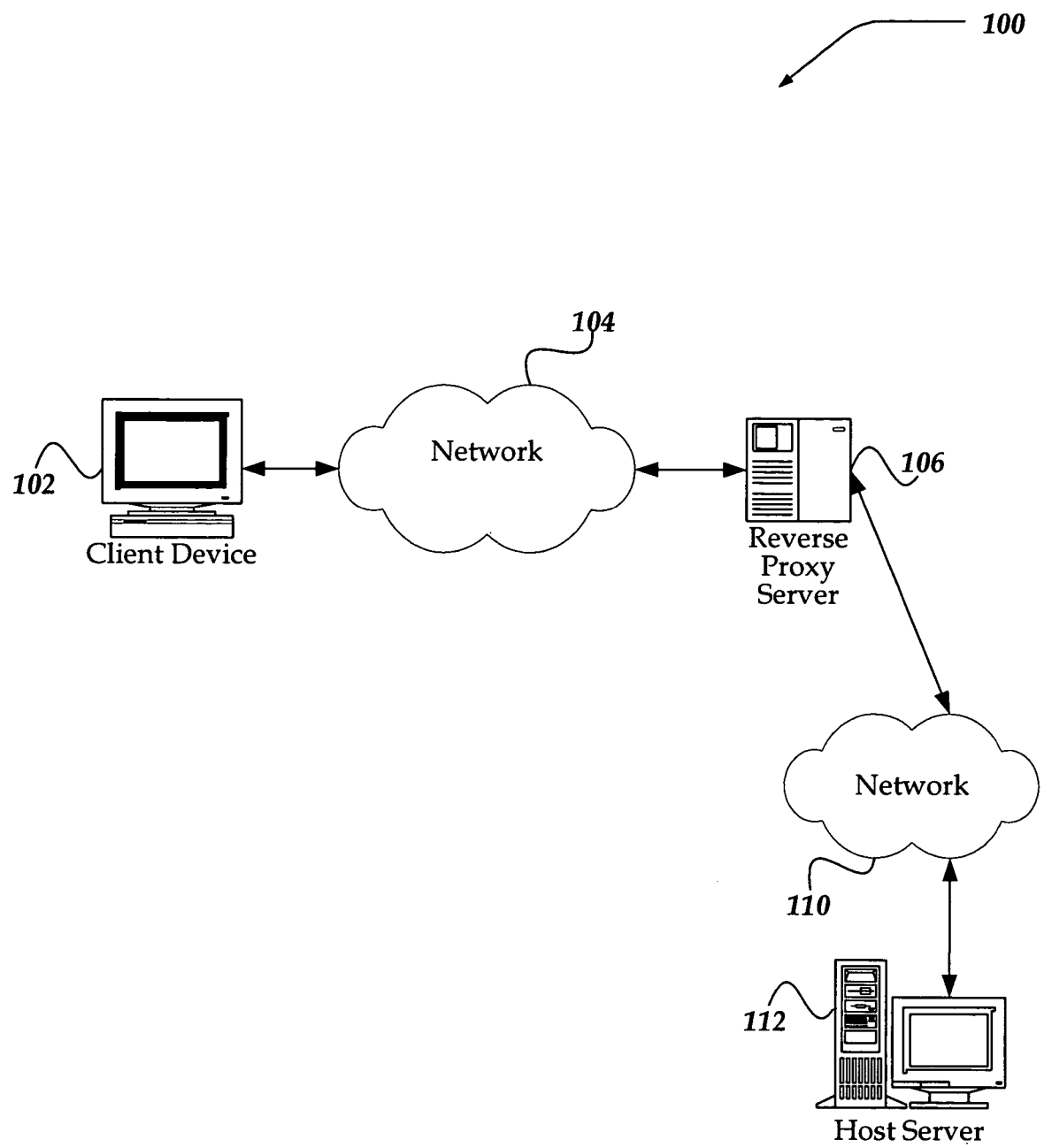
FIG. 1 illustrates one embodiment of an environment in which the invention may operate.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to a method and system of dynamically processing content as it flows through a reverse proxy server. Dynamic processing by the reverse proxy server may include pre-processing content before content patching by employing a user- or administrator-defined module, or post-processing content by employing another user- or administrator-provided module after content patching. A user may be a person employing a client device to interact with a host server through the reverse proxy server. An administrator may be a person who configures a reverse proxy server, either by direct interaction or by interacting with a network device that communicates with the reverse proxy server. As used herein, an administrator may also be a network device or a program executing on a network device that automatically communicates with the reverse proxy server and configures the reverse proxy server. For example, an automated administrator may monitor network activity relating to host servers, and send configuration data or instructions to the reverse proxy based on the monitoring.

The module may include one or more of code, a script, a set of rules, data that controls processing, and the like. In one embodiment, such dynamic processing further enables automatic launching of an application tunnel. An application tunnel enables a native client-side application to communicate back to a specific internal application server via a secure connection between a browser and an access server. This tunnel may often be implemented using HTTP protocol with secure socket layer (SSL) as transport, secure shell SSH, and the like. As used herein, the term "patching" refers to "content patching" as described above.

A reverse proxy server, according to one embodiment of the invention, includes a user- or administrator-defined module for handling HTTP data from a host server. The reverse proxy server may further include a generic module for processing and modifying the HTTP data. Performing the generic modifications is termed patching. The reverse proxy server may receive a request for the HTTP data from a client and determine the intended host server. Upon receiving the HTTP data from the host server in response to the forwarded request, the reverse proxy server may use one or both of a pre-patching module and a post-patching module to process the HTTP data. The pre-patching module and the post-patching module may also be uploaded automatically by an application residing at a firewall device, a host server, a proxy server, a network translation device, and the like. The pre-patching module may process a portion of the HTTP data (for example, editing links in the HTTP data such that a later request from the client based on a link in the HTTP data is directed to the reverse proxy server instead of the host server) that may later be modified by the generic patching process. In such a situation, the post-patching module may reverse the modification performed by the generic patching process leaving in tact the modification performed by the pre-patching module.

Some applications including, but not limited to, Telnet, mail via browser, video streaming, and the like, may require starting an application tunnel upon activation by the client. In a reverse proxy system, this may be difficult due to the client trying to connect to a port that may not be proxied by the reverse proxy server, the attempted application tunnel being blocked by a firewall or similar device or application. The present invention provides a solution for this problem by enabling the reverse proxy server to identify a link that requires the application tunnel and replace the link with instructions to launch the application tunnel. In one implementation, the instructions may include a java script. The inserted instructions may start the application tunnel and launch the application automatically upon a user clicking on the link. This dynamic implementation of launching the application tunnel may provide the client with a seamless connection to the requested application.

While user defined pre- and post-processing modules for injecting code to launch an application tunnel may be static, a pre-processing module may also be configured to automatically create and inject code for launching the application tunnel. This pre-processing module may create and inject code for launching the application tunnel covering common applications which may not be normally handled by a typical reverse-proxy application.

Examples of common applications, which may be detected by such a pre-processing module, allowing automatic creation/injection of application tunnel launching code include:
Telnet applications launched from intranet sites
   e.g. <a href="telnet://telnetserver.company.xyz:23">Telnet server</a>
File share launched from intranet sites
   e.g. <a href="file://fileshare.company.xyz/public">Windows file server</a>
Terminal services applications launched from intranet sites
Common Java applet and ActiveX based applications In the above examples, static user defined pre-processing modules may be created to inject code to launch an appropriate application tunnel for the particular intranet application. However, in many cases it may be possible to detect links for these common applications when analyzing the HTML content (during pre-processing stage), and to automatically inject proper application tunnel launching code.

The following is an example of a set of actions for finding and replacing telnet applications launched from an intranet site:

1) The pre-processing module scans html source for a hyperlink reference containing "telnet://"text.
2) The pre-processing module takes remainder of the hyperlink reference (e.g. telnetserver.company.xyz:23) for use in defining an application tunnel injection code.
3) The pre-processing module injects the application tunnel launching code, where "telnet://" indicates that an application tunnel should launch a local user's telnet client program after the application tunnel is established, "telnetserver.company.xyz" is the destination application tunnel end-point, and "23" is the port number for the application tunnel.

The <a href="telnet://telnetserver.company.xyz:23">Telnet server</a>link may be automatically replaced by the pre-processing module with the following example application tunnel launching code (based on the above steps).
<script>function createConnection(name,params) {var w_name=name+(Math.random( )).toString( ).substring (2,16); childWindow=window.open('https://firepass.company.xyz/vdesk/geekster/connection.php3?'+params,w_name,'name='+w_name+',resizable=0,scrollbars=0,statusbar=0,menubar=0,width=320, height=240',true);}</script><a href='javascript:createConnection (rhost0=telnetserver.company.xyz&rport0=23&cmd0=telnet%t elnetserver.company.xyz:23)'>Telnet server</a>

In the above example, the original hyperlink is replaced by javascript code which, when selected by a website user, launches an application tunnel to telnetserver.company.xyz on port 23, and then starts the telnet application. The telnet application is activated over the application tunnel.

Utilization of pre-patching and post-patching modules allows modification of HTTP data at an input and/or at an output of a generic patching process without the generic patching process being modified. Thus, pre- and post-patching modules complement a generic patching process performing the patching process and enable customization by the user. In one embodiment, the generic patching process may include website-independent modifications such as correcting invalid or incorrect links, inserting code for launching an application tunnel, and the like. A pre-patching module or a post-patching module may also complement the generic patching by providing website-dependent modifications. For example, the pre-patching module may provide a port identification number for the application tunnel launching code. In another example, a combination of a pre-patching module and a post-patching module may modify a link before and after the generic patching process, thereby preventing the link from being modified by the generic patching process. Thus, by employing a pre-patching module and a post-patching module, a user or a network administrator may customize the generic patching process in a website-dependent manner.

FIG. 1 illustrates one embodiment of an environment in which the present invention may operate. However, not all of these components may be required to practice the invention, and variations in the arrangement and type of the components may be made without departing from the spirit and scope of the invention.

As shown in the figure, system 100 includes client device 102, network 104, reverse proxy server 106, host server 112, and network 110. Network 104 represents a network, such as the Internet, and enables communication between client device 102 and reverse proxy server 106. Network 110 represents another network, such as an intranet, and enables communication between host server 112 and reverse proxy server 106.

Generally, client device 102 may include virtually any computing device capable of connecting to another computing device to send and receive information, including emails, and other interactive information. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium. A user may employ client device 102 or a client application that resides on client device 102 to interact with a host server through the reverse proxy server and modify pre- and post-patching modules.

Client device 102 may further include a client application, that is configured to manage the actions described above. Moreover, client device 102 may also include a web browser application, that is configured to enable an end-user to interact with other devices and applications, over Network 104. In one embodiment, the web browser is configured to provide various functions, including, but not limited to, authentication, ability to enable an end-user to customize a web browsing feature, and synchronization with another web browser application. The web browser may further enable inputs, such as keyboard, mouse, audio, and the like. The web browser may also perform some email related computations, including, but not limited to audio, visual, and the like. In one embodiment, client device 102 is configured to send and receive web browser related files, executables, audio files, graphic files, and the like.

Network 104 is configured to couple client device 102, with other client devices, and to reverse proxy server 106. Network 104 is enabled to employ any form of computer readable media for communicating information from one electronic device to another. In one embodiment, network 104 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for mobile devices, such as client device 102 with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 104 includes any communication method by which information may travel between client device 102 and reverse proxy server 106.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Reverse proxy server 106 is described in more detail below in conjunction with FIG. 2. Briefly, however, reverse proxy server 106 includes virtually any network device configured to include the reverse proxy server application. As such, reverse proxy server 106 may be implemented on a variety of computing devices including personal computers, desktop computers, multiprocessor systems, microprocessor-based devices, network PCs, servers, network appliances, and the like.

Reverse proxy server 106 may further provide secured communication for interactions, various security and administrative control services, including but not limited to, authentication, load balancing, and the like. For example, reverse proxy server 106 may be configured to filter requests that are received by reverse proxy server 106. Also, reverse proxy server 106 may be employed to mask the identity of host server 112, and the like.

Network 110 is configured to couple reverse proxy server 106 with host server 112. Network 110 is enabled to employ any form of computer readable media for communicating information from one electronic device to another. In one embodiment, network 110 is an intranet, and may include virtually all of the embodiments and functionalities described above for network 104. In another embodiment network 110 may be geographically restricted to a location such as a building, a group of buildings, and the like. Network 110 may employ various security mechanisms for connecting devices including, but not limited to, password protection, IP address authorization, and the like.

Host server 112 is virtually any network device that is configured to provide content to other network devices. Host server 112 may include virtually all embodiments and functionalities described above for client device 102 and reverse proxy server 106. In one embodiment, host server 112 may be coupled to an intranet and communicate with other devices outside the intranet through a firewall, network translation device, reverse proxy server 106, and the like.

Figure 2:
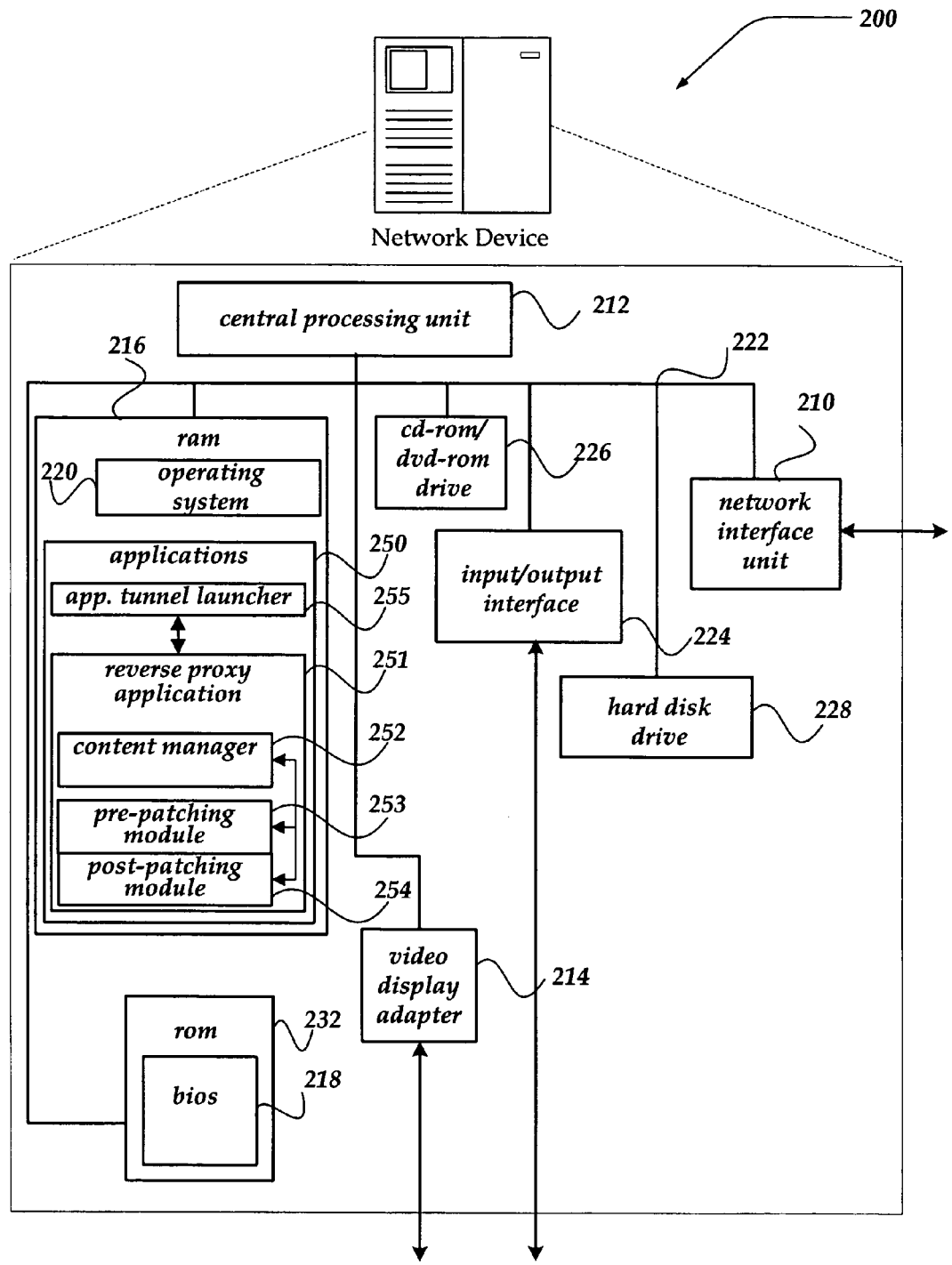
FIG. 2 is a functional block diagram illustrating one embodiment of a network device operating as a reverse proxy server.

FIG. 2 is a functional block diagram illustrating one embodiment of network device 200 operating as a reverse proxy server. Network device 200 may include many more components than those shown. The components shown, however, are sufficient to disclose an illustrative embodiment for practicing the invention.

Network device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive (not shown). The mass memory stores operating system 220 for controlling the operation of network device 200. Any general-purpose operating system may be employed. As illustrated in FIG. 2, network device 200 also can communicate with the Internet, or some other communications network, such as network 104 and network 110 in FIG. 1, via network interface unit 210, which is constructed for use with various communication protocols including the TCP/IP protocols. Network interface unit 210 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs may include transcoders, schedulers, graphics programs, database programs, word processing programs, HTTP programs, user interface programs, various security programs, and so forth. Mass storage may further include applications such as reverse proxy application 251.

Reverse proxy application 251 may be configured to enable network device 200 to manage the transfer of various forms of HTTP data between a client and a host server. In one embodiment, reverse proxy application 251 may include content manager 252, pre-patching modules 253, and post-patching modules 254. Content manager 252 may process the content, such as a patching content of HTTP data being transferred from the host server to the client. As described in more detail below, a generic patching process may include alteration of at least one link in the HTTP data such that a later request from the client based on the link is directed to network device 200 instead of the host server. Pre-patching modules 253 may include a user-defined module for processing particular types of links. Such processing may comprise repairing invalid or incorrect Uniform Resource Locators (URL) and correcting syntax errors in links. Post-patching modules 254 may include instructions for processing particular types of links based on an input from the system administrator or a user. In one embodiment, pre- and post-patching modules may include a script, a set of rules, data that controls processing, an applet, and the like. Pre- and post-modules may be dynamically programmed, edited by a system administrator, by a user, and the like. Reverse proxy application 251 may employ information provided by the modules within reverse proxy application 251, such as pre-patching and post-patching modules, in processing the HTTP data being transferred from the host server to the client. Reverse proxy application 251 may interact with other applications such as a client application, a security application, and a transport application.

Network device 200 may also include an HTTP handler application for receiving and handling HTTP requests, and an HTTPS handler application for handling secure connections. The HTTPS handler application may initiate communication with an external application in a secure fashion. Network device 200 may further include an application tunnel launcher 255 as part of the HTTPS handler or as a separate application. Reverse proxy application 251 may replace a link to an application with instructions such as an applet, and the like, that may instruct application tunnel launcher 255 to start an application tunnel automatically. The application tunnel, as described above, enables a native client-side application to communicate back to a specific internal application server via a secure connection between a browser and the access server. Moreover, network device 200 may further include applications that support virtually any secure connection protocol, including but not limited to Transport Layer Security (TLS), Tunneled TLS (TTLS), Extensible Authentication Protocol (EAP), Secure Sockets Layer (SSL), IP Security Protocl (IP-Sec), and the like.

Network device 200 may also include input/output interface 224 for communicating with external input or output devices, such as a mouse, keyboard, scanner, or other input or output devices not shown in FIG. 2. Likewise, network device 200 may further include additional mass storage facilities such as CD-ROM/DVD-ROM drive 226 and hard disk drive 228. Hard disk drive 228 may be utilized to store, among other things, application programs, databases, client device information, policy, security information including, but not limited to certificates, ciphers, passwords, and the like.

Figure 3:
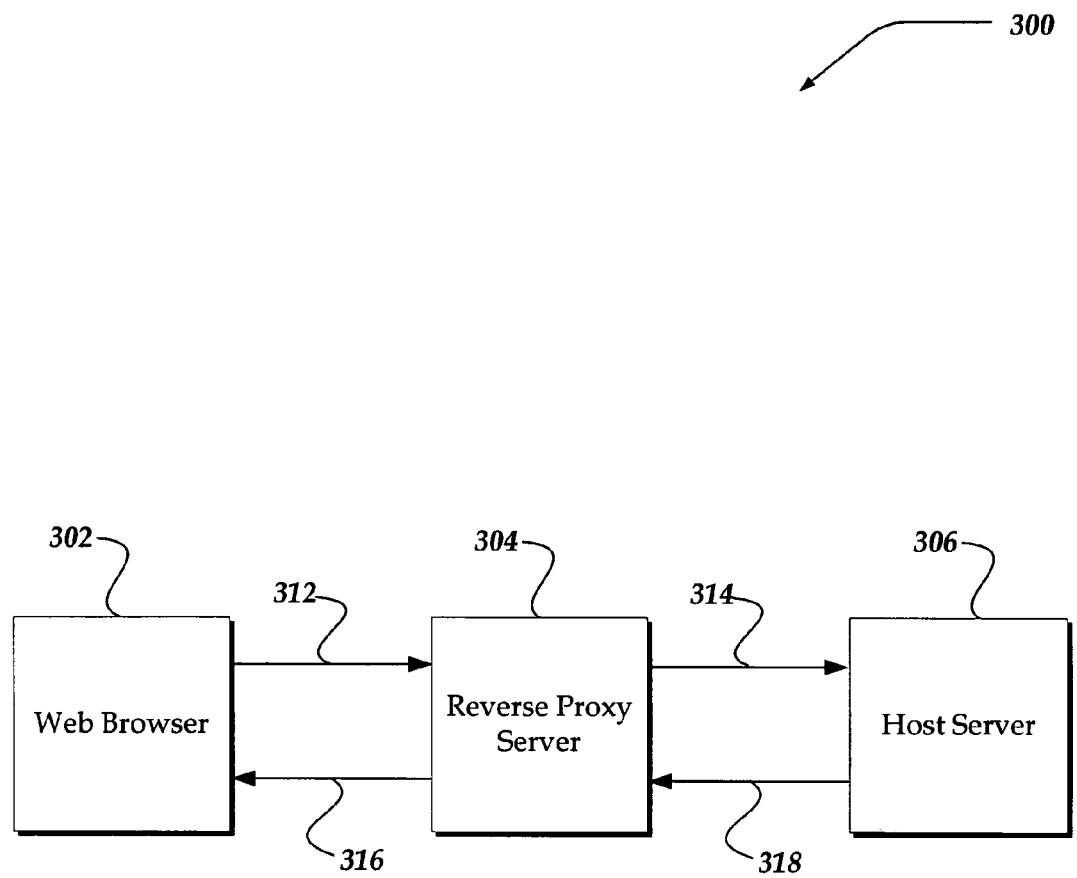
FIG. 3 is a block diagram illustrating one embodiment of a communication structure in a reverse proxy application.

FIG. 3 is a block diagram illustrating communication structure 300 in a reverse proxy system, in accordance with one embodiment of the present invention. Communication structure 300 includes web browser 302, reverse proxy server 304, and host server 306. Communication structure 300 further includes communications 312, 314, 316, and 318.

Communication 312 represents a request from web browser 302 that may be employed at a client device such as client device 102 of FIG. 1. The request may be an HTTP GET request, another type of HTTP request, or a request in accordance with another protocol such as HTTPS, which employs HTTP over SSL/TLS as transport. Upon receiving the request, reverse proxy server 304 determines a target host server, in this example host server 306. Furthermore, reverse proxy server 304 may determine one or more modifications that need to be made in the requested HTTP data. Reverse proxy server 304, then, forwards the request to host server 306 via communication 314. Host server 306 responds with communication 318 sending the requested HTTP data to reverse proxy server 304. The requested HTTP data may include a web page, a group of web pages, a data stream, and the like. Upon receiving the requested HTTP data from host server 306, reverse proxy server 304 may perform a series of actions associated with executing applicable module(s) and patching the HTTP data. Patching the data refers to, as described above, performing a generic patching on the data. Reverse proxy server 304 may further determine at least one modification to be performed before or after the generic patching. In one embodiment, the modification may be performed prior to the actions by the generic patching process. In another embodiment, the generic patching is performed first, then a post-patching module executed. Upon completion of processing the HTTP data, reverse proxy server 304 sends it to web browser 302 as represented by communication 316.

Communication pair 312 and 316 may be secure communications employing HTTPS or unsecure communications employing HTTP. Communication pair 314 and 318 may also employ a similar communication protocol.

In one embodiment, the pre-patching process or the post-patching process may facilitate the creation of an application tunnel by inserting instructions into the content. In some situations, an application at host server 306 communicating with a client may not be able to directly launch an application tunnel. This may occur due to the client trying to connect to a port that is not proxied by reverse proxy server 304, or an attempt to create an application tunnel that is blocked, for example, by a firewall. In some situations, although an application at host server 306 may be able to directly launch an application tunnel, it may be desirable not to do so. Instructions to launch the application tunnel dynamically from web browser 302 may produce the desired results. The pre- or post-patching process may insert the tunnel-launching instructions to launch the application tunnel.

The following is an example of a script that inserts code for automatically launching an application tunnel. This script may reside as part of the pre-patching module or the post-patching module. The example script injects the example java applet into a link for a telnet application called "http:\\intra-.company.xyz/telnetapp" in the processed HTTP data. If a user activates that link by clicking on it in a web browser, the java script automatically starts an application tunnel and launches the requested telnet application.

An example content processing script:
```
s/<a      href="http:Wintra\.company\.xyzVtelnetapp">/
  <script>function createConnection(pararms) {var w
  name=(Math.random    O).toStringO.substring(2,16);
  childWindow=window.open('https:WFP_ServiceAd-
  drVvdeskVgeeksterVcon    nection.php3?'+params,w
  name,'name='+w_name+',resizable=O,scrollbars=0,
  statusbar=0,menubar=0,width=320,height=2.40',
  true);} <Vscript><a href='javascript:createConnection
  ("rhost0=telnetapp.company.xyz\&rport0=
  23\&Ihost0=127.173.191.252_\&IportO=2.3\&curd.
  0=telnet%2_0127.173.191.252\&           dont
  warn=I\&name=telnetapp:23")'>/g
```

An example of another java applet code:
```
<HTML>
<head>
<title>Intranet Test Page</title>
<script>
function createConnection(params) { var w_name=(Math.
  random( )).toString( ).substring(2,16); childWindow
  window.open('https://Fire""Pass.company.xyz/vdesk/
  geekste.r/co    nnection.php3?'+params,  w  name,
  'name='+w    name+',resizable=0,scrollbars=O,status-
  bar=0,menubar=0,width=320, height=240', true); }
</script>
</head>
<body>
<a
href='javascript:createConnection
  ("rhostO=telnetapp.company.xyz&r_port0=23&
  Ihost0=127.173.191.252&Iport0=23&cmd0=telnet%
  20127.173.191.252&dont_warn=I&name=telnetapp:
  23")'>App Tunnel Test Link</a>
</body>
</HTML>
```

However, the invention is not limited to this example, and other implementations may be employed, without departing from the spirit or scope of the invention. For example, in one embodiment, such an implementation may include an ActiveX control.

Figure 4:
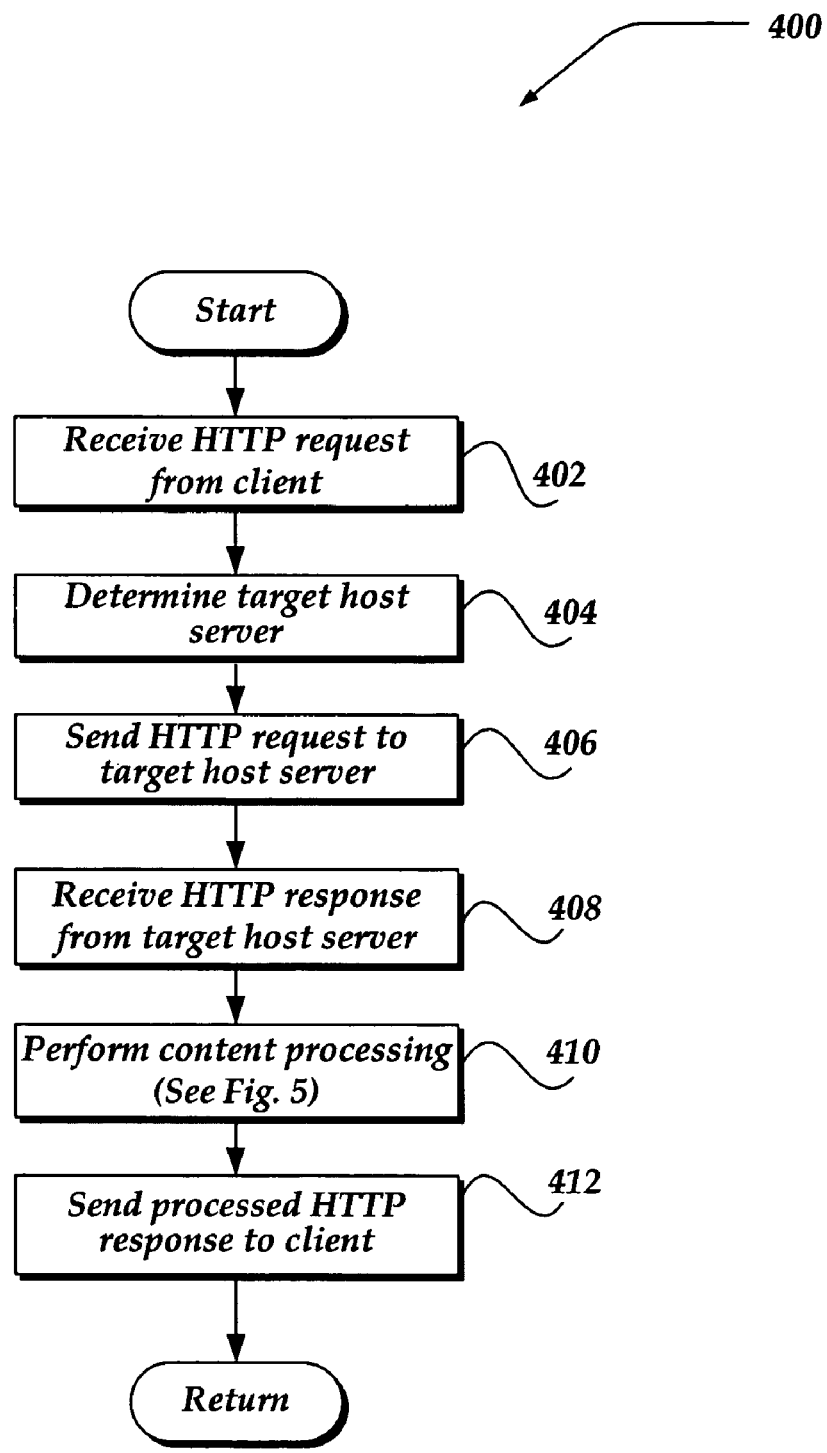
FIG. 4 is a flow diagram illustrating one embodiment of a process of a reverse proxy application that includes dynamic content.

FIG. 4 is a flow diagram generally showing process 400 of a reverse proxy application that includes content processing. Process 400 may, for example, be implemented in reverse proxy application 251 of FIG. 2.

As shown in the figure, process 400 begins after a start block, at block 402, where a request from a client is received. As discussed above, the request may be an HTTP GET request, another type of HTTP request, or a request in accordance with a protocol other than HTTP. The client may be a client application such as a web browser, residing on a network device such as client device 102 of FIG. 1. The request may be initiated by a click on a web page link by a user, an automated search result connection by a search engine, a redirection command from a server, an automated request from a client, and the like. Processing then proceeds to block 404.

At block 404, the reverse proxy determines a target host server. The determination may be based on information included in the HTTP request. Processing then proceeds to block 406.

At block 406, the HTTP request is forwarded to the target host server by the reverse proxy. Processing then proceeds to block 408, where a response to the HTTP request is received from the target host server. The target host server may respond with HTTP, HTML, or other data that is received at block 408 by the reverse proxy. Processing then proceeds to block 410.

At block 410, the reverse proxy performs content processing. Content processing may be performed on recognized URL or text patterns in the HTTP response by at least one of a pre-patching module, a post-patching module, and a generic patching process. Content processing may include insertion, modification, and deletion of a portion of the HTTP data, and correction of HTML errors in HTTP data. Actions performed by the reverse proxy for content processing are described in more detail below in conjunction with FIG. 5. Processing then proceeds to block 412.

At block 412, the processed HTTP response is forwarded to the client. Upon completion of block 412, processing returns to a calling process to perform further actions.

Figure 5:
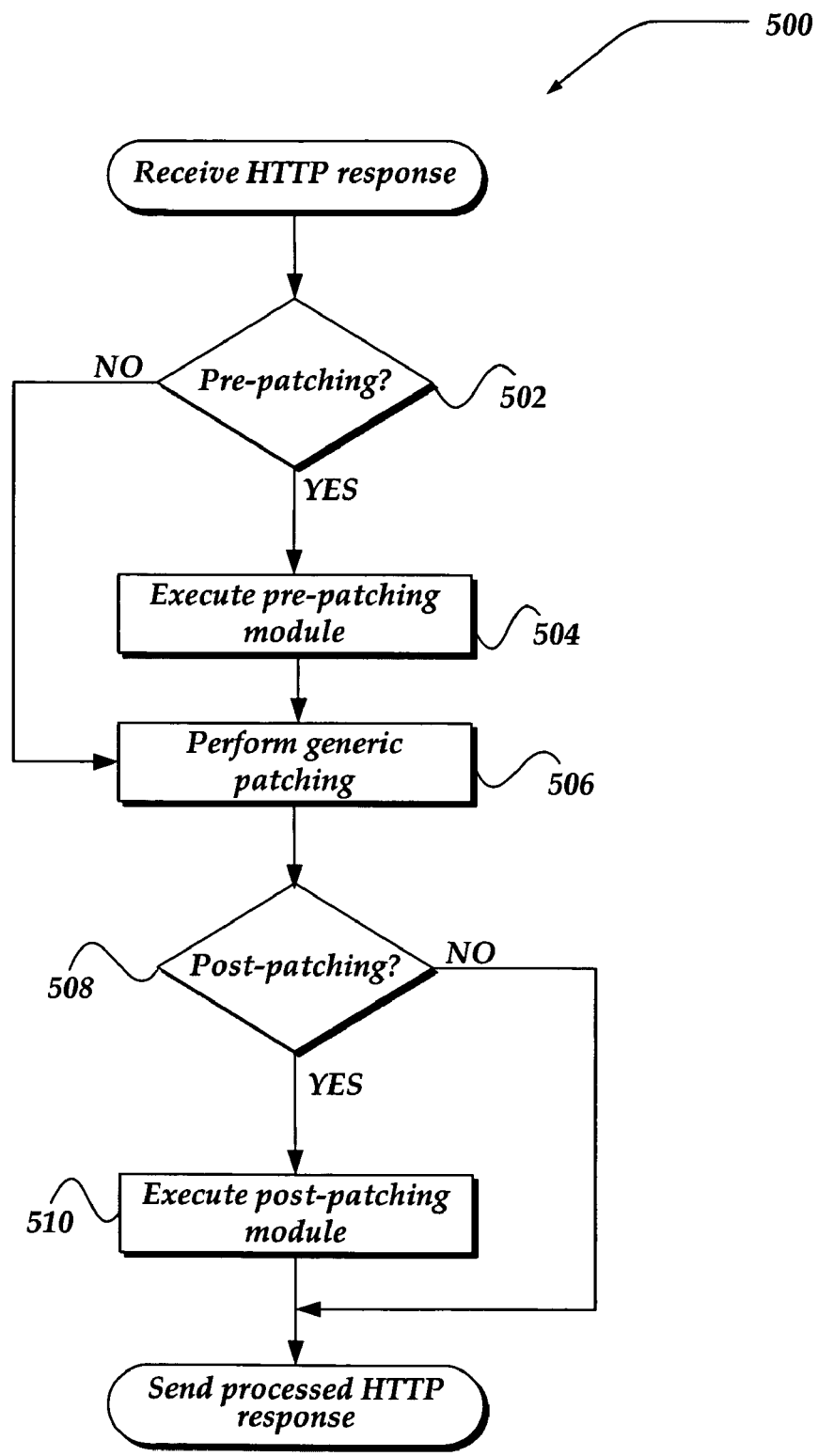
FIG. 5 is a flow diagram illustrating a process for content processing as part of the reverse proxy application shown in FIG. 4.

FIG. 5 is a flow diagram illustrating process 500 for content processing as part of the reverse proxy application shown in FIG. 4. Process 500 corresponds to block 410 of FIG. 4, and begins at decision block 502 following receipt of an HTTP response from a target host server.

Content processing may involve at least one of a pre-patching module, a post-patching module, and a generic patching process. In one embodiment, a plurality of pre- and post-patching modules may be available for content processing. A selection of one or more applicable pre-patching and post-patching modules may be based on an instruction by a system administrator, a selection by a user, a type of application associated with the request, and the like. The module may include a list of URL patterns to be recognized. The module may further include an action to be taken when a URL pattern is recognized. The action may include insertion, modification, and deletion of a portion of the HTTP data, and correction of HTML errors in HTTP data.

A module may be prepared by employing a script editor for performing actions that may not be handled by a generic patching process. SED and P-script are such stream editors that may be employed. In another embodiment, to prepare the module, an external script editor may be employed, and the module transferred to the reverse proxy application when completed. In a further embodiment, the module may be prepared by an integrated script editor in the reverse proxy application and stored in the reverse proxy server. As described before, the module may be user-defined, or prepared by a system administrator.

At block 502, a decision is made based on if a pre-patching module is to be executed or not. If the decision is negative, processing proceeds to block 506. If the decision is affirmative, processing proceeds to block 504.

At block 504, the pre-patching module is executed. As mentioned before, the execution of the module may include a modification, a deletion, and the like, of a part of the HTTP data, fixing of incorrect or invalid HTML code and so forth. For example, if a link on a webpage for displaying a video does not work properly after going through the reverse proxy, a module may insert an applet for loading individual images and displaying them quickly in succession to simulate the video. Processing then proceeds to block 506.

At block 506, a generic patching process is performed. The generic patching process may include a modification, a deletion, and the like, of a number of static links in the HTTP data.

In one embodiment, the pre-processing module may insert a tag indicating whether an application tunnel is to be started, whether the generic patching is to "force-patch" a link, or to not modify a link. The generic content patching may not have the ability to recognize when to insert instructions for launching the application tunnel, or may not have all of the information for inserting such instructions. By inserting the tag into the HTTP data, the pre-patching module may enable the generic patching engine to use the tag to determine generic patching operations, such as launching of the application tunnel.

In a further embodiment, the HTTP response may not include a port number for launching an application tunnel. The pre-patching module may insert a port number to the HTTP response providing the generic patching process with a specific port to launch the application tunnel from. In the example below, such a port number (23) is inserted by the pre-patching module, which can be employed by the generic patching process to launch an application tunnel for a "Telnet Application."

The following is an example of HTML received by a reverse proxy from a web server:

```
<html>
<head> <title>Intranet Test Page</title> </head>
<body>
<a href='telnet://telnetapp.company.xyz'>Telnet Application</a>
</body>
</html>
```

The following is an example of the above example after processing by a pre-patching module that has inserted an application tunnel launching tag:

```
<html>
<head>
<title>Intranet Test Page</title>
</head>
<body>
<a href='_APP_TUNNEL_TAG(telnetapp.company.xyz,23,
    telnet%20telnetapp.company.xyz)_'>Telnet Application</a>
</body>
</html>
```

The following is an example result of determining tags as part of generic content processing and replacing the tags with an application tunnel launching java script code. The following example is based on processing the above example HTML.

```
<html>
<head>
<title>Intranet Test Page</title>
</head>
<body>
<a href='javascript:createConnection
    ("rhost=telnetapp.company.xyz&rport0=23&cmd0=
    telnet%teln etapp.company.xyz")'
>Telnet Application</a>
</body>
</html>
```

There may be one or more types of tags. One type of tag may indicate if a link is to be patched by the generic patching process. If this type of tag is present, generic patching process does not modify the link, so a pre- or post-patching module may be necessary to modify the link. Processing then proceeds to block 508.

At block 508, a decision is made if a post-patching module is to be executed or not. If the decision is negative, content processing is completed and the processed HTTP response to sent to the requesting client. If the decision is affirmative, processing proceeds to block 510, where the post-patching module is executed. Execution of post-patching module may be substantially similar to the execution of pre-patching module as described for block 504. The post-patching module may include actions for HTTP links or portions of HTML text that may be modified by the generic patching process. Such actions may include reversing a modification performed by the generic patching process, further modifying a link already changed by the generic patching process, and the like. Upon completion of post-patching module execution, processed HTTP data is forwarded to the requesting client.

Figure 6:
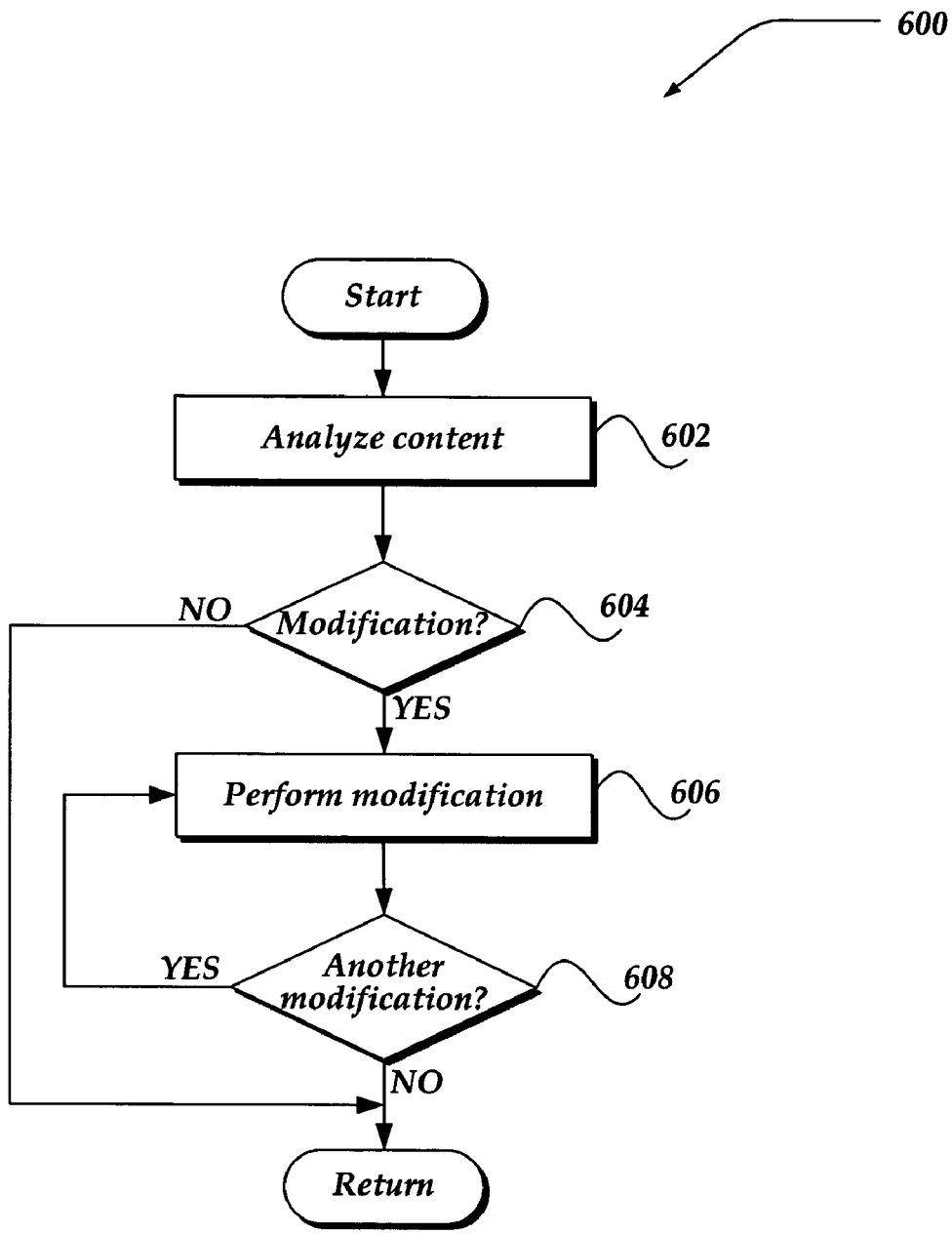
FIG. 6 is a flow diagram illustrating a process for content processing as implemented in a pre-patching or post-patching module, according to the present invention.

FIG. 6 is a flow diagram illustrating process 600 for content processing as implemented in a pre-patching or post-patching module. Process 600 corresponds to blocks 504 and/or 510 of FIG. 5, and begins at block 602.

At block 602, received HTTP, HTML, or other data is analyzed for HTTP links or portions of HTML text that is to be processed by the module. In one embodiment, the module may include a list of URL patterns that are compared against the content of the HTTP data being analyzed. The list of URL patterns in the module may define a scope of the content to be processed by the module. In another embodiment, wildcard characters, such as "*", may be employed to indicate a series of URLs with a common part to be processed by the module. An empty list in the module may indicate no URLs to be processed by that particular module. The module may further define a type of content to be processed. The type of content may include plain text, HTML text, java script, and the like. In a further embodiment, an empty type field may indicate that all types of content are to be processed by the module.

At block 604, a decision is made whether a modification is to be performed on a recognized URL or not. If the decision is negative, processing is completed and proceeds to a calling process for further actions. If the decision is affirmative processing proceeds to block 606.

At block 606 a modification is performed on a recognized URL or portion of HTTP text. Some URL patterns may be defined by the generic patching process, while other URL patterns may be defined by the module as described above. There may also be URL patterns that are defined by both the generic patching process and the module. For example, generic patching may include modification of the URL "www.example.com". The pre-patching module might change "www.example.com" to "www.modified.com" preventing it from being modified by generic patching. Subsequently, the post-patching module may change "www.modified.com" back to "www.example.com" leaving the URL in tact in the processed HTTP response. Processing then proceeds to decision block 608.

At block 608, a decision is made whether another modification is to be performed. If the decision is negative, processing is completed and proceeds to a calling process for further actions. If the decision is affirmative processing returns to block 606 for another modification.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks. Moreover, the invention is not limited to the above listed examples, and other implementations may be employed, without departing from the spirit or scope of the invention.

Although the invention is described in terms of communication between a reverse proxy server and clients and host servers, the invention is not so limited. For example, the communication may be between virtually any resource, including but not limited to multiple users, multiple servers, and any other device, and include any type of messaging without departing from the scope of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

I claim:

1. A network device coupled over a network to a client device, comprising:
   a processor configured to perform actions including:
   receiving a pre-patching module for processing a content of HTTP reply data from a host server that is a subject of an HTTP request from the client device to the host server over the network, wherein the pre-patching module includes at least one of a user-defined search pattern, a user-defined action, or a user-defined substitution data;
   receiving the requested HTTP reply data from the host server for processing the content of the HTTP reply data;
   upon receiving the requested HTTP reply data, executing the pre-patching module on the received HTTP reply data to:
      generate pre-patched HTTP reply data based on modifying a portion of the content of the received HTTP reply data, wherein the pre-patched HTTP reply data includes the modified portion of the content of the received HTTP reply data; and
      modify at least one action performed by a generic patching module; and
   upon completion of the execution of the pre-patching module and prior to sending data that corresponds to the pre-patched HTTP reply data from the network device, performing generic patching by executing the generic patching module on the pre-patched HTTP reply data and leaving unmodified by the generic patching at least some of the portion of the content modified by the pre-patching module.

2. The network device of claim 1, wherein the processor is further configured to perform additional actions including:
   receiving a post-patching module for processing the received content, wherein the post-patching module includes at least one of a different user-defined search pattern, a different user-defined action, and a different user-defined substitution data; and
   executing the post-patching module on the pre-patched and generic patched HTTP reply data after performing the generic patching on the pre-patched HTTP reply data, wherein execution of the post-matching module modifies at least a portion of a result of the generic patching.

3. The network device of claim 2, wherein executing the pre-patching module and the post-patching module includes:
   analyzing the content of the HTTP reply data based on the user-defined search pattern;
   performing the user-defined action; and
   if the user-defined action includes substituting a portion of the content, substituting the portion of the content with the user-defined substitution data.

4. The network device of claim 3, wherein the user-defined search pattern includes a list of at least one Uniform Resource Locator (URL).

5. The network device of claim 4, wherein the processor is arranged to analyze the content by searching the content for the at least one URL that is listed in the user-defined search pattern.

6. The network device of claim 3, wherein the user-defined action includes selectively performing modifications by at least one of deleting a portion of the content, modifying a portion of the content, inserting a tag, and inserting a new portion of content.

7. The network device of claim 6, wherein the pre-patching module is arranged to insert into the content the tag that is associated with launching an application tunnel.

8. The network device of claim 7, wherein the generic patching includes inserting a set of instructions to launch an application tunnel based, in part, on the tag that is inserted into the content by the pre-patching module.

9. The network device of claim 7, wherein the generic patching includes selectively inserting a set of instructions to launch an application tunnel based, in part, on whether the tag has been inserted into the content by the pre-patching module.

10. The network device of claim 6, wherein the pre-patching module is arranged to insert into the content a port identification for an application tunnel.

11. The network device of claim 6, wherein the pre-patching module is arranged to insert into the content a port identification for an application tunnel, and wherein performing the generic patching includes inserting a set of instructions to launch an application tunnel, the set of instructions including the port identification.

12. The network device of claim 2, wherein at least one of the user-defined search pattern, the user-defined action, and the user-defined substitution data is uploaded by at least one of the user or a network administrator.

13. The network device of claim 2, wherein at least one of the user-defined search pattern, the user-defined action, and the user-defined substitution data is uploaded automatically by an application.

14. The network device of claim 13, wherein the application includes at least one of a host server, a proxy server, a firewall, and a network address translator (NAT).

15. The network device of claim 2, wherein:
the pre-patching module is further arranged to modify a link such that generic processing does not recognize the link as a link to be modified; and
the post-patching module is further arranged to modify the link such that the link in the pre-process HTTP data is preserved.

16. The network device of claim 1, further comprising:
a transceiver configured to exchange HTTP data with the client device and the host server; and
a memory configured to store at least one of a pre-patching module and a post-patching module.

17. The network device of claim 1, wherein the pre-patching module and the post-patching module comprise at least one of a script, a set of rules, data that controls processing, and a java applet.

18. A network device coupled over a network to a client device for providing reverse proxy services, comprising:
a processor configured to perform actions including:
receiving a user-defined script for processing a content of HTTP reply data from a host server that is a subject of an HTTP request from the client device over the network, wherein the user-defined script includes at least one of a search pattern, an action, and a substitution data, and wherein the user-defined script is at least one of a pre-patching script or a post-patching script;
receiving the requested HTTP reply data from the host server for processing the content of the HTTP reply data;
upon completion of receiving the requested HTTP reply data and prior to sending data that corresponds to the received HTTP reply data from the network device and if the user-defined script is pre-patching, generating pre-patched HTTP reply data based on executing the pre-patching script on the received HTTP reply data and performing generic patching by executing a generic patching module on the pre-patched HTTP reply data, and wherein the user-defined script modifies a portion of the received content of the HTTP reply data from the host server and modifies at least one action performed by the generic patching upon the pre-patch HTTP reply data and the generic patching leaves unmodified at least some of the portion of the content modified by the pre-patching; and
upon completion of receiving the requested HTTP reply data and if the user-defined script is post-patching, performing generic patching by executing a generic patching module and then executing the post-patching script, wherein the user-defined script modifies at least a portion of a result of performing the generic patching.

19. The network device of claim 18, wherein executing the user-defined script includes:
analyzing the content of the HTTP reply data based on the search pattern that is included in the user-defined script;
performing the action that is included in the user-defined script; and
if the action includes substituting a portion of the content, substituting the portion of the content with the substitution data that is included in the user-defined script.

20. A reverse proxy server coupled over a network to a client device for providing a user with a mechanism for performing website-dependent modifications to a content of proxied HTTP data, comprising:
a transceiver configured to exchange HTTP data with a client and a host server;
a memory configured to store at least one user-defined module, wherein the user-defined module is at least one of a pre-patching module and a post-patching module; and
a processor configured to perform actions including:
receiving the user-defined module for processing a content of HTTP reply data from the host server that is a subject of an HTTP request from the client device over the network, wherein the user-defined module includes at least one website-dependent modification based, in part, on at least one of a user-defined search pattern, a user-defined action, and a user-defined substitution data, and wherein the search pattern, the action, and the substitution data are included in the user-defined module, and wherein the search pattern, the action, and the substitution data are defined by the user prior to receipt of the module in the processor;
receiving the requested HTTP reply data from the host server for processing the content of the HTTP reply data;
upon completion of receiving the requested HTTP reply data and prior to sending data that corresponds to the received HTTP reply data from the network device and if the user-defined module is pre-patching, generating pre-patched HTTP reply data based on executing the pre-patching module on the received HTTP reply data and then performing generic patching by executing a generic patching module, on the pre-patched HTTP reply data, wherein generic patching includes at least one website-independent modification of the content of the received HTTP reply data, and wherein the user-defined module modifies a portion of the received content of the HTTP reply data from the host server and modifies an action performed by the generic patching upon the received HTTP reply data and the generic patching does not modify at least some of the portion of the content modified by the pre-patching; and
if the user-defined module is post-patching, performing generic patching by executing a generic patching module and then executing the post-patching module, wherein the user-defined module modifies at least a portion of a result of performing the generic patching.

21. The reverse proxy server of claim 20, wherein at least one portion of the user-defined module is uploaded by one of the user and a network administrator.

22. The reverse proxy server of claim 20, wherein at least one portion of the user-defined module is uploaded automatically by an application.

23. A network device coupled over a network to a client device, comprising:
a processor configured to perform actions including:
receiving a user-defined pre-patching script for processing a content of HTTP reply data from a host server that is a subject of a HTTP request from the client device over the network, wherein the pre-patching script is arranged to insert into the content a port identification for an application tunnel;
receiving the requested HTTP reply data from the host server for processing the content of the HTTP reply data;
upon completion of receiving the requested HTTP reply data and prior to sending data that corresponds to the received HTTP reply data from the network device, executing the pre-patching script on the received HTTP reply data to:
  generate pre-patched HTTP reply data based on modifying a portion of the content of the received HTTP reply data; and
  to modify an action taken by a generic patching module upon the pre-patched HTTP reply data; and
after executing the pre-patching script and prior to sending from the network device data corresponding to the pre-patched HTTP reply data, performing generic patching by executing the generic patching module on the pre-patched HTTP reply data, wherein generic patching includes inserting a set of instructions to launch an application tunnel, the set of instructions including the port identification, and wherein the generic patching does not modify at least some of the portion of the content modified by the pre-patching script.

24. A method for providing a reverse proxy service operably coupled to a client device over a network, comprising:
  receiving at least one user-defined module for processing a content of HTTP reply data from a host server that is a subject of an HTTP request from the client device over the network, wherein the user-defined module includes at least one of a user-defined search pattern, a user-defined action, and a user-defined substitution data, and wherein the user-defined module is one of a pre-patching module or a post-patching module;
  receiving the requested HTTP reply data from the host server for processing the content of the HTTP reply data;
  upon completion of receiving the requested HTTP reply data and prior to sending data that corresponds to the received HTTP reply data from the network device and if the user-defined module is pre-patching, generating pre-patched HTTP reply data based on executing the pre-patching module on the received HTTP reply data and performing generic patching by executing a generic patching module, on the pre-patched HTTP reply data, wherein the user-defined module modifies a portion of the received content and modifies an action performed by the generic patching module and the generic patching does not modify at least some of the portion of the content modified by the pre-patching; and
  if the user-defined module is post-patching, performing generic patching by executing a generic patching module and then executing the post-patching module, wherein the user-defined module modifies at least a portion of a result of performing the generic patching.

25. The method of claim 24, further comprising:
  storing the at least one user-defined module in a memory; and
  forwarding the processed HTTP data to a requesting client.

26. The method of claim 24, wherein receiving the at least one user-defined module comprises uploading of the user-defined module by at least one of the user, a network administrator, and automatically by an application.

27. The method of claim 24, wherein executing the user-defined module comprises:
  analyzing the content of the HTTP reply data based on the search pattern that is included in the user-defined module;
  performing the action that is included in the user-defined module; and
  if the action includes substituting a portion of the content, substituting the portion of the content with the substitution data that is included in the user-defined module.

28. A network device coupled over a network to a client device for providing reverse proxy service, comprising:
  a means for providing a user with a mechanism for performing website-dependent modifications to a content of proxied HTTP reply data, wherein the means for providing the user with the mechanism comprises:
    a means for receiving at least one user-defined module for processing a content of HTTP reply data from a host server that is a subject of an HTTP request from the client device over the network, wherein the user-defined module is one of a pre-patching module and a post-patching module;
    a means for storing the at least one user-defined module in a memory;
    a means for receiving the requested HTTP reply data from the host server for processing the content of the HTTP reply data;
    upon completion of receiving the requested HTTP reply data and prior to sending-data that corresponds to the received HTTP reply data from the network device if the user-defined module is pre-patching, a means for performing generic patching by executing a generic patching module on pre-patched HTTP reply data generated by executing the pre-patching module on the received HTTP reply data, and wherein the user-defined module modifies a portion of the received content and modifies an action performed by the generic patching on the pre-patched HTTP reply data and the means for generic patching does not modify at least some of the portion of the content modified by the pre-patching module;
    if the user-defined module is post-patching, a means for performing generic patching by executing a generic patching module and then executing the post-patching module such that the post-patching modifies at least a portion of a result of performing the generic patching; and
  a means for forwarding the processed HTTP reply data to a requesting client.

* * * * *